(12) United States Patent
Murakami et al.

(10) Patent No.: US 7,193,793 B2
(45) Date of Patent: Mar. 20, 2007

(54) IMAGING LENS

(75) Inventors: Kazuya Murakami, Itabashi (JP); Yasuhiko Abe, Toda (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/071,417

(22) Filed: Mar. 2, 2005

(65) Prior Publication Data

US 2005/0231826 A1 Oct. 20, 2005

(30) Foreign Application Priority Data

Mar. 30, 2004 (JP) ............... 2004-100760

(51) Int. Cl.
*G02B 9/12* (2006.01)
*G02B 13/18* (2006.01)

(52) U.S. Cl. .............. 359/791; 359/716; 359/740
(58) Field of Classification Search ............. 359/791, 359/716
See application file for complete search history.

(56) References Cited

U.S. PATENT DOCUMENTS

| 4,548,480 A * | 10/1985 | Yamamoto et al. ......... 359/650 |
| 4,810,075 A * | 3/1989 | Fukuda ..................... 359/650 |
| 2004/0196575 A1* | 10/2004 | Nozawa ..................... 359/791 |
| 2005/0030645 A1* | 2/2005 | Do ............................ 359/791 |

FOREIGN PATENT DOCUMENTS

| JP | 07-168095 A | 7/1995 |
| JP | 11-052227 A | 2/1999 |
| JP | 2001-133684 A | 5/2001 |
| JP | 2002-098888 A | 4/2002 |

OTHER PUBLICATIONS

Patent Abstracts of Japan for JP2002-098888 published Apr. 5, 2002.
Patent Abstracts of Japan for JP2001-133684 published May 18, 2001.
Patent Abstracts of Japan for JP11-052227 published Feb. 26, 1999.
Patent Abstracts of Japan for JP07-168095 published Jul. 4, 1995.

* cited by examiner

*Primary Examiner*—Jordan M. Schwartz
(74) *Attorney, Agent, or Firm*—Darby & Darby

(57) ABSTRACT

An imaging lens includes, in sequence from the object side to the image plane side: a first lens with a convex object side surface and having a positive overall index of refraction; an aperture stop having a predetermined diameter; a second lens with a convex object side surface and having an overall positive index of refraction; and a third lens with a concave object side surface and an overall negative index of refraction. At least one surface of the first lens is formed as an aspherical surface. Both surfaces of the third lens are formed as aspherical surfaces, with the image side surface having an inflection point at which the curvature of the surface changes within the effective diameter range. The imaging lens provides superior optical characteristics and is compact and suited for use in mobile cameras installed in portable telephones, PDAs, and the like.

9 Claims, 4 Drawing Sheets

IMAGING LENS

INCORPORATION BY REFERENCE

The present application claims priority under 35 U.S.C. §119 to Japanese Patent Application No. 2004-100760 filed on Mar. 30, 2004. The content of the application is incorporated herein by reference in its entirety.

FIELD OF THE INVENTION

The present invention relates to a compact imaging lens that can be used in, for example, digital still cameras and digital video cameras equipped with a solid-state imaging element such as a CCD or CMOS element. More specifically, the present invention relates to an imaging lens suitable for compact mobile cameras that can be installed in portable telephones, personal digital assistants (PDAs), portable personal computers, and the like.

BACKGROUND OF THE INVENTION

In recent years, there have been significant technological advances in solid-state imaging elements such as CCDs that make it possible to obtain images close in resolution to those of film cameras. At the same time, CCDs and the like can be made compact and with high pixel counts. Thus, there is a strong demand for an imaging lens used in digital still cameras and the like to be high-performance while also being at least compact, thin, low-cost.

With imaging lenses installed in conventional portable telephones, portable information terminals, and the like, a small number of lenses is used, e.g., one or two lenses. While the design is compact and thin, the lens can only handle CCDs and the like with pixel counts of 100,000 to 300,000, making the resulting images unsatisfactory.

This problem can be overcome by increasing the number of lenses with a three-group, three-lens imaging lens (e.g., Japanese Laid-Open Patent Publication Number Hei 11-52227 and Japanese Laid-Open Patent Publication Number Hei 07-168095).

In the conventional imaging lens with the three-group, three-lens structure described above, however, the attempt to correct various types of aberration results in a longer back focus. This results in a greater total length for the lens system and prevents the structure from meeting the demands for compactness, thinness, and the like. Thus, the structure cannot be easily housed in a restricted, narrow space as an imaging lens for portable telephones, PDAs, and portable personal computers.

OBJECT AND SUMMARY OF THE INVENTION

The object of the present invention is to overcome these problems and to provide an imaging lens with superior optical properties that: uses a very simple structure involving three groups of lenses and three lenses; uses a compact, thin, and light design; and is suited for use in portable telephones, PDAs, and the like that can handle solid-state imaging elements with 1,000,000 pixels or more.

An imaging lens according to the present invention includes, in sequence from an object side to an image plane side: a first lens with a convex surface facing the object side and an overall positive index of refraction; an aperture stop forming an opening with a predetermined diameter; a second lens with a convex surface facing the object side and an overall positive index of refraction; a third lens with a concave surface facing the object side and an overall negative index of refraction. In the first lens, an object-side and/or an image plane side surface is formed as an aspherical surface. In the third lens, both an object-side and an image plane side surface are formed as aspherical surfaces, and an inflection point where curvature orientation changes is positioned within an effective diameter range of the image plane side surface.

With this structure, the first lens and the second lens have positive indexes of refraction and the third lens has a negative index of refraction. As a result, an appropriate back focus can be maintained while the total length of the lens system can be reduced. In addition to the shorter, more compact design, the aspherical surfaces of the first lens and the third lens and the surface on the image plane side of the third lens with an inflection point provide effective corrections of various types of aberrations, particularly astigmatism and distortion, and as a result, superior optical properties.

With the structure described above, it would also be possible to have the first lens and the third lens formed from synthetic resin. With this structure, the lens system can be made lighter and less expensive compared to the use of glass. More specifically, it would be possible to easily mold aspherical surfaces and surfaces with inflection points.

With the structures described above, it would also be possible to have condition (1) below met:

$$TL/f<1.4 \tag{1}$$

where f is a focal length of the lens system and TL is a total length of the lens system from an object-side surface of the first lens to the image plane. With this structure, the total length of the lens system can be reduced to provide a compact and thin design.

With the structure described above, it would also be possible to have condition (2) below met:

$$v1>45, v2>45, v3>45 \tag{2}$$

where v1 is an Abbe number of the first lens, v2 is an Abbe number of the second lens, and v3 is an Abbe number of the third lens. With this structure, particularly lateral chromatic aberration can be effectively corrected and particularly, as a result, superior optical characteristics can be provided.

With the structure described above, it would also be possible to have condition (3) below met:

$$0.5<|R1/R2|<2 \tag{3}$$

where R1 is a curvature radius of the object side surface of the first lens and R2 is a curvature radius of the image plane side surface of the first lens. With this structure, an appropriate back focus can be maintained while the total length of the lens system can be kept short. Various aberrations can be effectively corrected, especially astigmatism and distortion, and superior optical properties can be provided.

With the structure described above, it would also be possible to have condition (4) below met:

$$D23/f<0.1, D5/f<0.2 \tag{4}$$

where f is a focal length of the lens system, D23 is a distance along an optical axis between the first lens and the second lens, D5 is a distance along the optical axis between the second lens and the third lens. With this structure, the outer diameter dimension of the lens system can be kept small. Good correction can be provided especially for astigmatism and distortion, and superior optical properties can be provided.

With the structure described above, it would also be possible to have condition (5) below met:

$$0.8<D1/D6<1.3 \quad (5)$$

where D1 is a thickness along the optical axis of the first lens and D6 is a thickness along the optical axis of the third lens. With this structure, the total length of the lens system can be kept short and an appropriate back focus can be maintained. Good correction can be provided especially for astigmatism, and superior optical properties can be provided.

With an imaging lens according to the present invention as described above, the design can be made compact, thin, light, low-cost, and the like, and an imaging lens suitable for mobile cameras installed in portable telephones, portable information terminals, and the like can be provided. More specifically, the total length of the lens system can be reduced (e.g., to 6 mm or less) according to the size of the imaging element such as a CCD. The result is a compact and thin imaging lens with superior optical properties that provides good correction for various types of aberration.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The preferred embodiments of the present invention will be described, with references to the figures.

Figure 1:
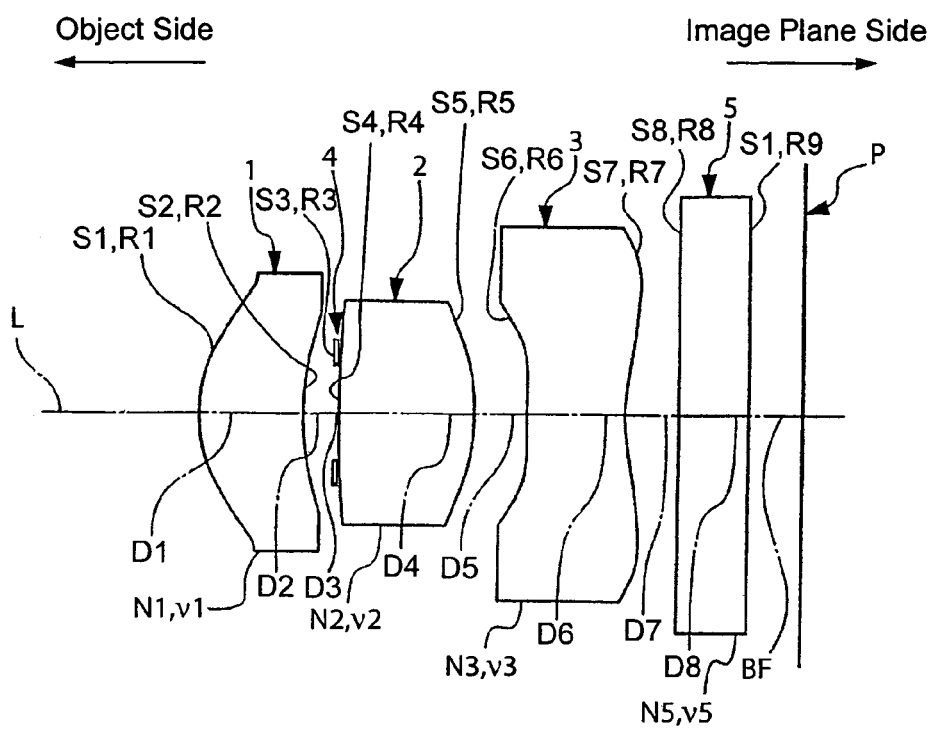
FIG. 1 is a drawing showing the structure of an embodiment of an imaging lens according to the present invention.
Figure 2:
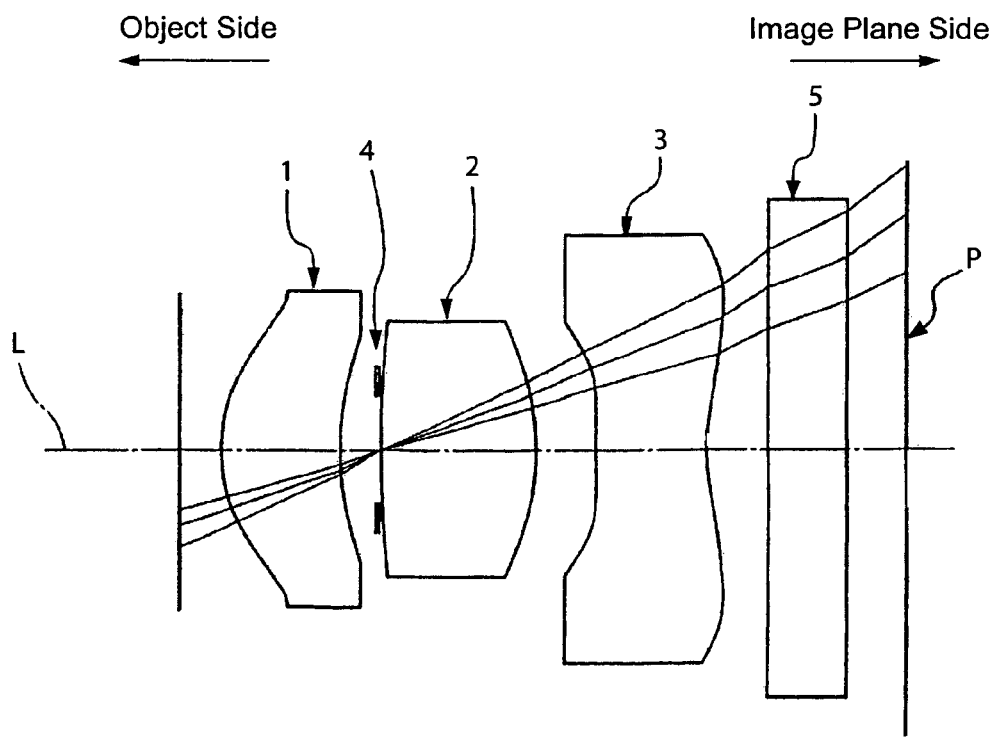
FIG. 2 is a ray diagram for the lens system shown in FIG. 1.

FIG. 1 and FIG. 2 show an embodiment of an imaging lens according to the present invention. FIG. 1 is a drawing showing the basic structure of a lens system. FIG. 2 is an optical ray diagram.

As shown in FIG. 1, going from the object side to the image plane side along the optical axis L, the following lenses are arranged: a first lens 1 having a positive overall index of refraction and a convex surface facing the object side; a second lens 2 having a positive overall index of refraction and a convex surface facing the object side; a third lens 3 having a negative overall index of refraction and a concave surface facing the object side.

In the arrangement described above, an aperture stop 4 forming a predetermined diameter is disposed between the first lens 1 and the second lens 2. Behind the third lens 3, there is a glass filter 5, e.g., an infrared cut filter, a low-pass filter, or the like. Behind that is located an image plane P for the CCD or the like.

More specifically, this structure forms an imaging lens with three groups and three lenses. The first lens 1 forms a first lens group, the second lens 2 (and the aperture stop 4) forms the second lens group, and the third lens 3 forms the third lens group.

As shown in FIG. 1, for the first lens 1, the aperture stop 4, the second lens 2, the third lens 3, and the glass filter 5, each surface is labeled $S_i$ (i=1–9), the curvature radius of a surface $S_i$ is labeled $R_i$ (i=1–9). For the first lens 1, the second lens 2, the third lens 3, and the glass filter 5, the index of refraction and the Abbe number along a d-line is labeled $N_i$ and $v_i$, respectively (i=1–3, 5). Furthermore, the gaps (thickness, air space) along the optical axis L between the first lens 1 and the glass filter 5 are labeled $D_i$ (i=1–8). The back focus from the glass filter 5 to the image plane P is labeled BF. The focal length of the lens system having the above structure is labeled as f. The total length along the optical axis of the lens system from the object-side surface S1 of the first lens 1 to the image plane P is labeled TL (air conversion distance). The gap along the optical axis L between the first lens 1 and the second lens 2 is labeled D23 (=D2+D3). The gap along the optical axis L between the second lens 2 and third lens 3 is labeled D5.

The first lens 1 is a meniscus lens with the object-side surface S1 forming a convex surface and the image-side surface S2 forming a concave surface so that the overall index of refraction is positive. Also, either one or both of the object-side surface S1 and the image-side surface S2 of the first lens 1 is formed as an aspherical surface.

The second lens 2 is a double-convex lens with the object-side surface S4 forming a convex surface and the image-side surface S5 forming a convex surface so that the overall index of refraction is positive.

The third lens 3 is a double-concave lens with the object-side surface S6 forming a concave surface and the image-side surface S7 forming a concave surface. Also, the object-side surface S6 and the image-side surface S7 of the third lens 3 are both formed as aspherical surfaces. Furthermore, the image-side surface S7 of the third lens 3 is formed with an inflection point within the effective diameter range where the curvature orientation changes.

The aspherical surfaces of the first lens 1 and the third lens 3 have the relationship indicated by the equation below:

$$Z=Cy^2/[1+(1-\epsilon C^2 y^2)^{1/2}]+Dy^4+Ey^6+Fy^8+Gy^{10}+Hy^{12}$$

where Z is the distance from a tangent plane at an apex of the aspherical surface to a point on the aspherical surface where the height from the optical axis L is y; y is the height from the optical axis; C is a curvature (1/R) at the apex of the aspherical surface; $\epsilon$ is the conic constant; and D, E, F, G, H are the aspherical surface coefficients.

In the structure above, the relationship between the focal length f of the lens system and the total length TL (air conversion distance) of the lens system can be expressed as follows:

$$TL/f<1.4. \quad (1)$$

This condition relates to the thickness of the lens system and defines the ratio between the dimension of the lens system along the optical axis L and a suitable focal length for the lens system overall. More specifically, by meeting this condition a compact, thin lens system can be provided.

In the structure described above, the Abbe number v1 of the first lens 1, the Abbe number v2 of the second lens 2, and the Abbe number v3 of the third lens 3 are set up as follows:

$$v1 > 45, \ v2 > 45, \ v3 > 45. \quad (2)$$

These relationships define suitable ranges for the Abbe numbers. By meeting these conditions, various aberrations, including lateral chromatic aberration in particular, can be effectively corrected.

Also, in the structure described above, the curvature radius R1 on the object side and the curvature radius R2 on the image side of the first lens 1 are set up so that the following condition is met:

$$0.5 < |R1/R2| < 2. \quad (3)$$

This relationship defines the ratio of the curvature radii of the first lens 1. By meeting this condition, an appropriate back focus can be maintained while keeping the total length of the lens system short. At the same time, various aberrations, including astigmatism and distortion can be effectively corrected. This makes it possible to provide superior optical properties.

With the above structure, the distance D23 (=D2+D3) along the optical axis L from the first lens 1 to the second lens 2 and the distance D5 along the optical axis L from the second lens 2 to the third lens 3 are set up so that the following conditions are met.

$$D23/f < 0.1, \ D5/f < 0.2 \quad (4)$$

These relationships define the distance along the optical axis for the second lens 2 and the third lens 3. If these conditions are not met, the angle of incidence to the CCD is lower, which is advantageous, but the total length TL of the lens system is increased while the outer diameter of the third lens 3 is increased as well. This makes correction of astigmatism and distortion difficult. Thus, by meeting these conditions, the outer diameter of the lens system can be kept small while astigmatism and distortion can be effectively corrected. This makes it possible to provide superior optical properties.

Furthermore, in the structure described above, the thickness D1 of the first lens 1 and the thickness D6 of the third lens 3 are set up so that the following condition is met.

$$0.8 < D1/D6 < 1.3. \quad (5)$$

This relationship defines the proper ratio of thicknesses of the first lens 1 and the third lens 3. By meeting this condition, the total length TL of the lens system can be kept short while an appropriate back focus can be maintained. Various aberrations, especially astigmatism, can be effectively corrected, thus providing superior optical properties.

Figure 3:
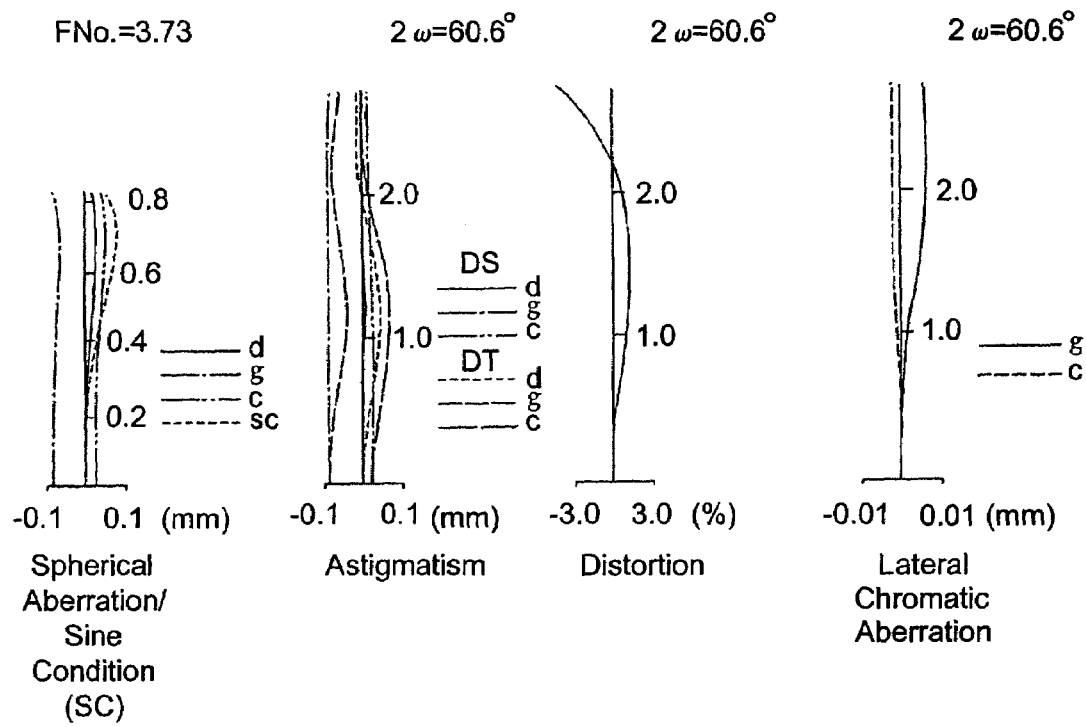
FIG. 3 shows spherical aberration, astigmatism, distortion, and lateral chromatic aberration for an imaging lens according to embodiment 1 of the present invention.
Figure 4:
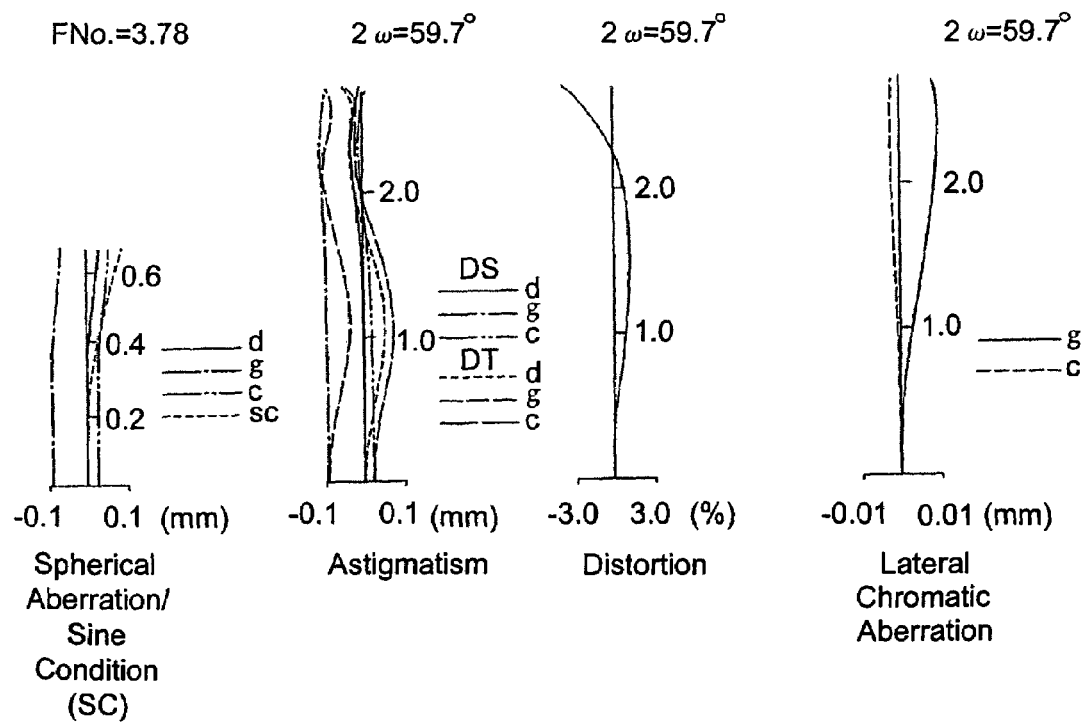
FIG. 4 shows spherical aberration, astigmatism, distortion, and lateral chromatic aberration for an imaging lens according to embodiment 2 of the present invention.
Figure 6:
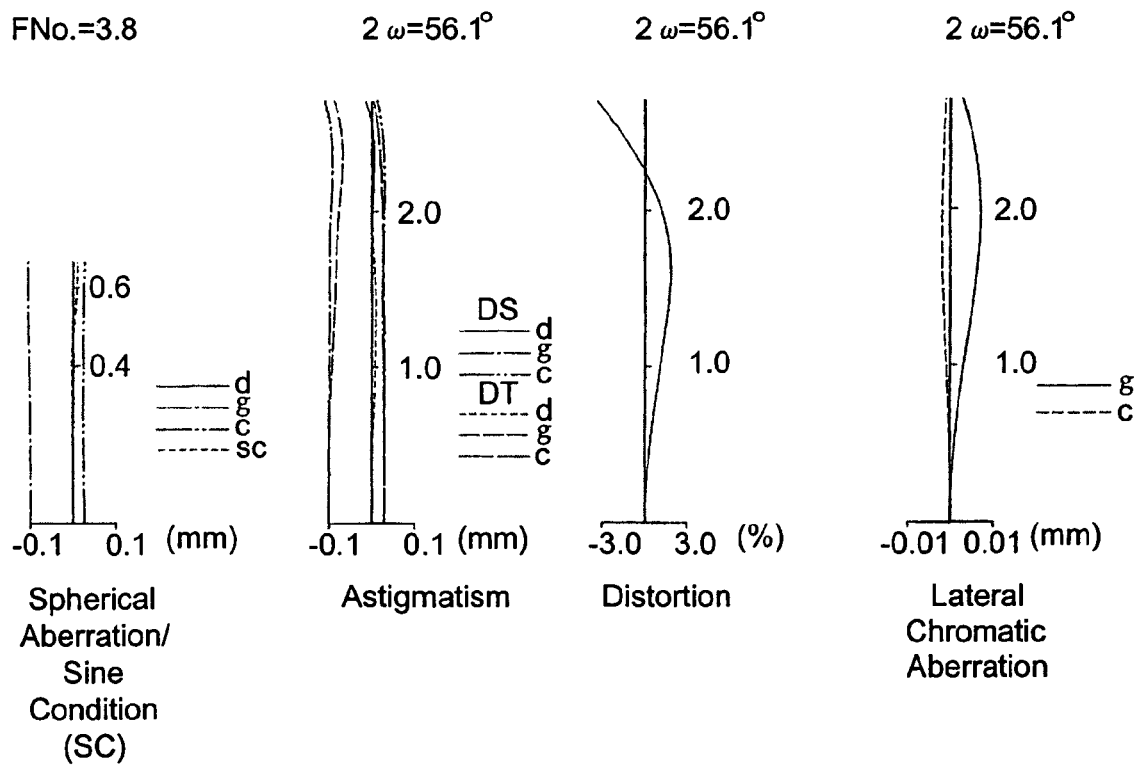
FIG. 6 shows spherical aberration, astigmatism, distortion, and lateral chromatic aberration for an imaging lens according to embodiment 3 of FIG. 5.

Embodiments that implement specific numerical values for the structure described above are presented below as three embodiments of the present invention. Aberration diagrams for spherical aberration, astigmatism, distortion, and lateral chromatic aberration are indicated in FIG. 3 for embodiment 1, in FIG. 4 for embodiment 2, and FIG. 6 for embodiment 3. In FIGS. 3, 4, and 6, d indicates the aberration from the d-line, g indicates the aberration from the g-line, c indicates the aberration from the c-line, SC indicates the degree of dissatisfaction against the sine condition, DS indicates the aberration at the sagittal plane, and DT indicates the aberration at the meridional plane.

The basic structure of the lens system in embodiment 1 of the present invention is shown in FIG. 1. The main specifications are shown in Table 1, various numerical data (settings) are shown in Table 2, and numerical data relating to the aspherical surfaces are shown in Table 3.

In this embodiment, the numerical data for the conditions (1)–(5) are as follows: TL/f=1.13; v1=56.4; v2=70.4; v3=56.4; |R1/R2|=0.56; D23/f=0.071; D5/f=0.098; and D1/D6=1.067.

TABLE 1

| Focal Length f (mm) | 4.81 | Total Length TL of Lens System (Air Conversion Distance Used For D8 (Glass Filter 5)) (mm) | 5.426 |
|---|---|---|---|
| F number | 3.73 | Back Focus (Air Conversion) (mm) | 1.25 |
| Field Angle (2ω) | 60.6° | Object Distance | Infinity (∞) |

TABLE 2

| Surface | Curvature radius (mm) | | Distance (mm) | | Index of Refraction (d line) | Abbe number | |
|---|---|---|---|---|---|---|---|
| S1 * | R1 | 1.800 | D1 | 1.034 | N1 | 1.50914 | v1 56.4 |
| S2 * | R2 | 3.239 | D2 | 0.34 | | | |
| S3 | R3 | ∞ | D3 | 0.00 | | | |
| | Aperture Stop | | | | | | |
| S4 | R4 | 6.356 | D4 | 1.363 | N2 | 1.48749 | v2 70.4 |
| S5 | R5 | −4.451 | D5 | 0.47 | | | |
| S6 * | R6 | −15.17 | D6 | 0.969 | N3 | 1.50914 | v3 56.4 |
| S7 * | R7 | 2.528 | D7 | 0.45 | | | |
| S8 | R8 | ∞ | D8 | 0.65 | N5 | 1.51680 | v5 64.2 |
| S9 | R9 | ∞ | | | | | |
| | | | BF | 0.37 | | | |

* aspherical surface

TABLE 3

| Aspherical Surface Coefficient | | Numerical Data |
|---|---|---|
| Surface S1 | ε | 0.9096407 |
| | D | −0.41 × $10^{-2}$ |
| | E | 0.25791049 × $10^{-2}$ |
| | F | −0.50639746 × $10^{-2}$ |
| | G | 0.17695061 × $10^{-2}$ |
| | H | −0.12917401 × $10^{-2}$ |
| Surface S2 | ε | 8.382582 |
| | D | −0.215 × $10^{-1}$ |
| | E | 0.15958714 × $10^{-1}$ |
| | F | −0.6039 × $10^{-1}$ |
| | G | 0.12547102 × $10^{-1}$ |
| | H | −0.61611594 × $10^{-2}$ |
| Surface S6 | ε | −24 |
| | D | −0.13688336 |
| | E | 0.27621467 × $10^{-1}$ |
| | F | −0.10197073 × $10^{-1}$ |
| | G | 0.33959446 × $10^{-2}$ |
| | H | −0.14932088 × $10^{-2}$ |
| Surface S7 | ε | −8.031178 |
| | D | −0.3817289 × $10^{-1}$ |
| | E | 0.55304461 × $10^{-2}$ |
| | F | −0.40984201 × $10^{-3}$ |
| | G | −0.1181031 × $10^{-3}$ |
| | H | 0.14044561 × $10^{-4}$ |

In the embodiment described above, the total length of the lens system (the front surface S1 of the first lens 1 to the image plane P) is 5.426 mm (fixed), the back focus (air conversion) is 1.25 mm, the F number is 3.73, and the field of view (2ω) is 60.6°. This provides an imaging lens that has a thin design and a short total length. Various aberrations are corrected effectively and superior optical properties are provided.

FIG. 1 shows the basic structure of a lens system according to embodiment 2 shown in FIG. 4. The main specifications are shown in Table 4, various numerical data (settings) are shown in Table 5, and numerical data relating to the aspherical surfaces are shown in Table 6.

In this embodiment, the numerical data for the conditions (1)–(5) are as follows: TL/f=1.14; ν1=56.4; ν2=70.4; ν3=56.4; |R1/R2|=0.56; D23/f=0.073; D5/f=0.109; and D1/D6=1.07.

TABLE 4

| Focal Length f (mm) | 4.90 | Total Length TL of Lens System (Air Conversion Distance Used For D8 (Glass Filter 5)) (mm) | 5.572 |
|---|---|---|---|
| F number | 3.78 | Back Focus (Air Conversion) (mm) | 1.46 |
| Field Angle (2ω) | 59.7° | Object Distance | Infinity (∞) |

TABLE 5

| Surface | Curvature radius (mm) | Distance (mm) | Index of Refraction (d line) | | Abbe number | |
|---|---|---|---|---|---|---|
| S1 * | R1 | 1.845 | D1 | 0.99 | N1 | 1.50914 | ν1 | 56.4 |
| S2 * | R2 | 3.285 | D2 | 0.360 | | | | |
| S3 | R3 | ∞ | D3 | 0.00 | | | | |
| | Aperture Stop | | | | | | | |
| S4 | R4 | 11.14 | D4 | 1.307 | N2 | 1.48749 | ν2 | 70.4 |
| S5 | R5 | −3.19 | D5 | 0.533 | | | | |
| S6 * | R6 | −16.86 | D6 | 0.922 | N3 | 1.50914 | ν3 | 56.4 |
| S7 * | R7 | 2.673 | D7 | 0.35 | | | | |
| S8 | R8 | ∞ | D8 | 0.85 | N5 | 1.51680 | ν5 | 64.2 |
| S9 | R9 | ∞ | | | | | | |
| | | | BF | 0.55 | | | | |

* aspherical surface

TABLE 6

| Aspherical Surface Coefficient | | Numerical Data |
|---|---|---|
| Surface S1 | ε | 0.91370305 |
| | D | −0.23049044 × 10$^{-2}$ |
| | E | 0.96621543 × 10$^{-3}$ |
| | F | −0.47874152 × 10$^{-2}$ |
| | G | 0.19065832 × 10$^{-2}$ |
| | H | −0.14 × 10$^{-2}$ |
| Surface S2 | ε | 8.604126 |
| | D | −0.18808332 × 10$^{-1}$ |
| | E | 0.18259035 × 10$^{-1}$ |
| | F | −0.6039 × 10$^{-1}$ |
| | G | 0.13281396 × 10$^{-1}$ |
| | H | −0.6 × 10$^{-2}$ |
| Surface S6 | ε | 1.511526 |
| | D | −0.13244356 |
| | E | 0.35787423 × 10$^{-1}$ |
| | F | −0.10583345 × 10$^{-1}$ |
| | G | 0.81982146 × 10$^{-3}$ |
| | H | −0.21 × 10$^{-2}$ |
| Surface S7 | ε | −8.627989 |
| | D | −0.3819134 × 10$^{-2}$ |
| | E | 0.52835456 × 10$^{-1}$ |
| | F | −0.2922609 × 10$^{-2}$ |
| | G | −0.11654786 × 10$^{-3}$ |
| | H | 0.11644203 × 10$^{-3}$ |

In embodiment 2 described above, the total length of the lens system (the front surface S1 of the first lens 1 to the image plane P) is 5.572 mm (fixed), the back focus (air conversion) is 1.46 mm, the F number is 3.78, and the field of view (2ω) is 59.7°. This provides an imaging lens that has a thin design and a short total length. Various aberrations are corrected effectively and superior optical properties are provided.

Figure 5:
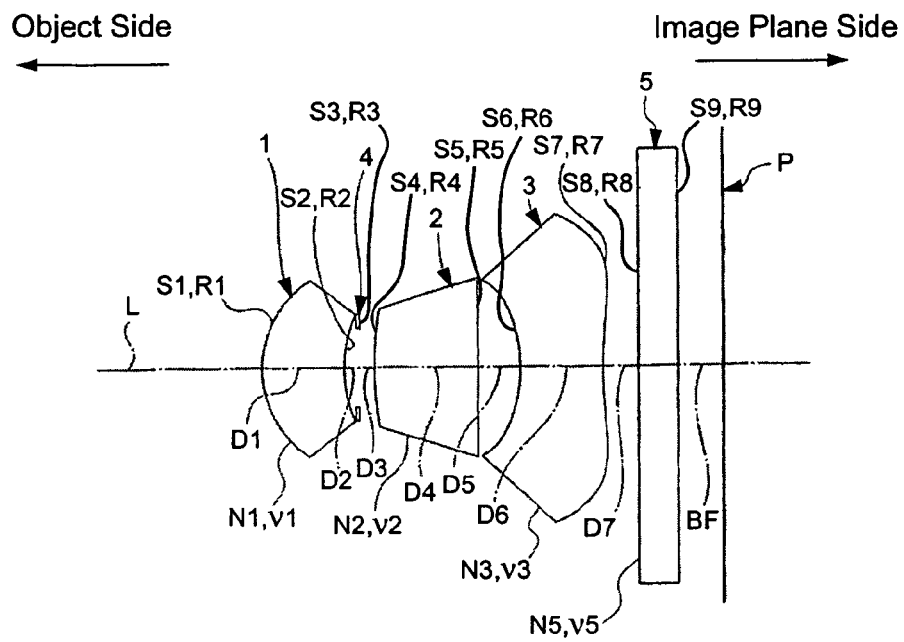
FIG. 5 is a drawing showing the structure of an imaging lens according to embodiment 3 of the present invention.

FIG. 5 shows the basic structure of a lens system according to embodiment 3. The main specifications are shown in Table 7, various numerical data (settings) are shown in Table 8, and numerical data relating to the aspherical surfaces are shown in Table 9.

In this embodiment, the numerical data for the conditions (1)–(5) are as follows: TL/f=1.05; ν1=56.4; ν2=70.4; ν3=56.4; |R1/R2|=0.633; D23/f=0.072; D5/f=0.099; and D1/D6=0.990.

TABLE 7

| Focal Length f (mm) | 5.04 | Total Length TL of Lens System (Air Conversion Distance Used For D8 (Glass Filter 5)) (mm) | 5.28 |
|---|---|---|---|
| F number | 3.8 | Back Focus (Air Conversion) (mm) | 1.07 |
| Field Angle (2ω) | 56.1° | Object Distance | Infinity (∞) |

TABLE 8

| Surface | Curvature radius (mm) | Distance (mm) | Index of Refraction (d line) | | Abbe number | |
|---|---|---|---|---|---|---|
| S1 * | R1 | 1.526 | D1 | 1.029 | N1 | 1.50914 | ν1 | 56.4 |
| S2 * | R2 | 2.412 | D2 | 0.104 | | | | |
| S3 | R3 | ∞ | D3 | 0.259 | | | | |
| | Aperture Stop | | | | | | | |
| S4 | R4 | 4.257 | D4 | 1.3 | N2 | 1.48749 | ν2 | 70.4 |
| S5 | R5 | −115.045 | D5 | 0.5 | | | | |
| S6 * | R6 | −5.998 | D6 | 1.018 | N3 | 1.50914 | ν3 | 56.4 |
| S7 * | R7 | 4.366 | D7 | 0.45 | | | | |
| S8 | R8 | ∞ | D8 | 0.5 | N5 | 1.51680 | ν5 | 64.2 |
| S9 | R9 | ∞ | | | | | | |
| | | | BF | 0.29 | | | | |

* aspherical surface

TABLE 9

| Aspherical Surface Coefficient | | Numerical Data |
|---|---|---|
| Surface S2 | ε | 6.685684 |
| | D | −0.14545547 × 10$^{-1}$ |
| | E | −0.13696155 × 10$^{-1}$ |
| | F | −0.24736546 × 10$^{-1}$ |
| | G | 0.35309455 × 10$^{-1}$ |
| | H | −0.16250054 |
| Surface S6 | ε | −21.61739 |
| | D | −0.13688336 |
| | E | 0.21422895 × 10$^{-1}$ |
| | F | −0.22560768 × 10$^{-1}$ |
| | G | 0.71925303 × 10$^{-2}$ |
| | H | −0.71707118 × 10$^{-2}$ |
| Surface S7 | ε | −21.22914 |
| | D | −0.3817289 × 10$^{-1}$ |
| | E | 0.26873306 × 10$^{-2}$ |
| | F | −0.57213806 × 10$^{-3}$ |
| | G | −0.16170325 × 10$^{-4}$ |
| | H | −0.17658436 × 10$^{-4}$ |

In embodiment 3 described above, the total length of the lens system (the front surface S1 of the first lens 1 to the image plane P) is 5.28 mm (fixed), the back focus (air conversion) is 1.07 mm, the F number is 3.8, and the field of view (2ω) is 56.1°. This provides an imaging lens that has a thin design and a short total length. Various aberrations are corrected effectively and superior optical properties are provided.

COMPARATIVE EXAMPLE

Figure 7:
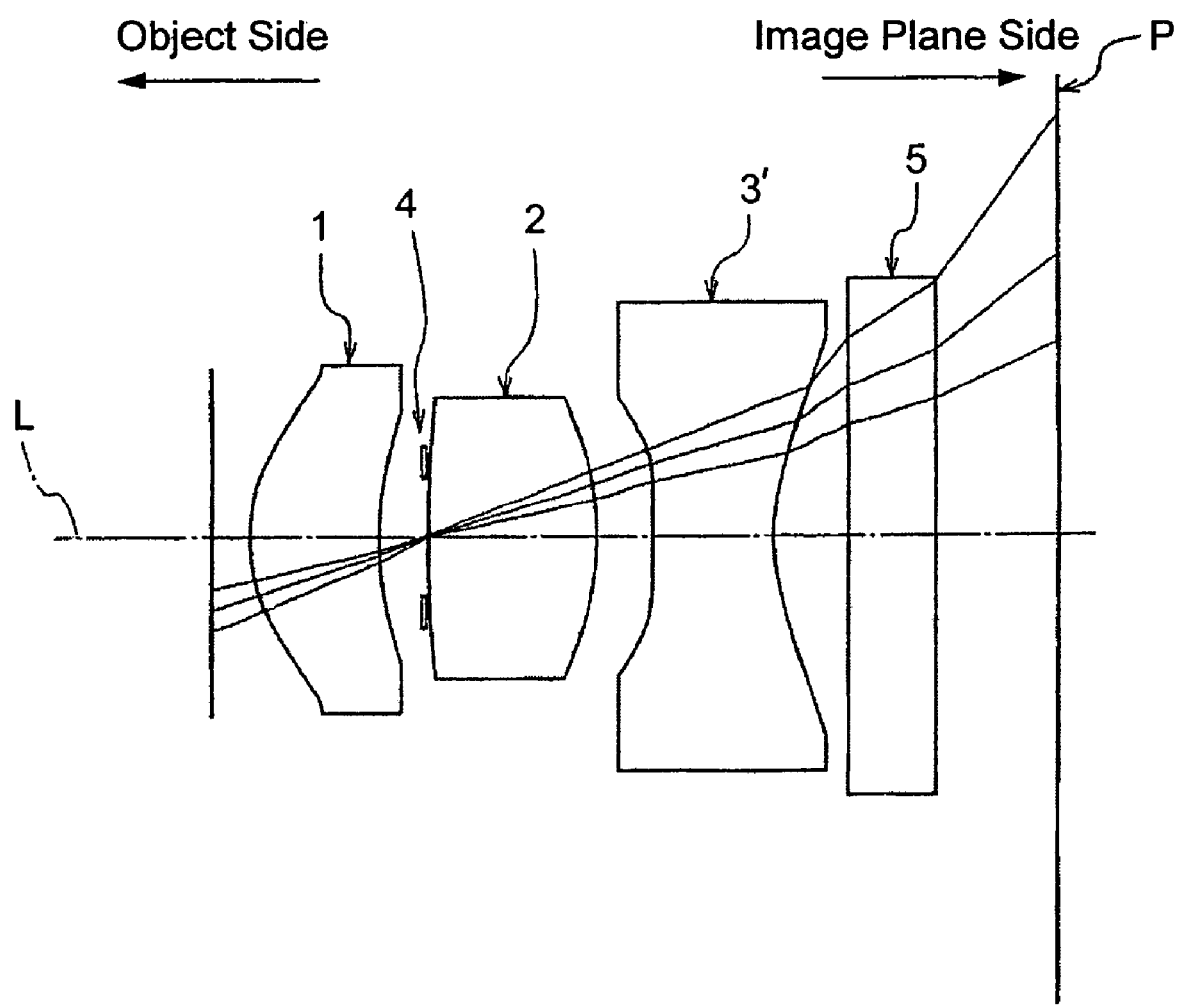
FIG. 7 is a ray diagram for a lens system serving as a comparative example.

In FIG. 7, the third lens is modified to serve as a comparative example. More specifically, in the imaging lens in this comparative example, the third lens 3' is a double-concave lens with both the object-side and image-side surfaces being formed as concave surfaces so that the overall index of refraction is negative. The image-side surface is formed as a simple concave surface with no inflection point where the orientation of the curvature changes.

Thus, with this imaging lens, the exit angle of an optical ray after it has passed through the third lens 3' is greater than that of an optical ray for the imaging lens with an inflection point shown in FIG. 2. In this comparative example, the exit angle of the chief ray is 30.0° vertical, 40.6° horizontal, and 56.5° diagonal. In embodiment 1 through embodiment 3, the exit angle of the chief ray is 30.0° vertical, 37.3° horizontal, and 41.1° diagonal.

As described above, the imaging lens of the present invention can be used as an imaging lens in digital still cameras, digital video cameras, and the like equipped with an imaging element such as a CCD. In particular, it can be used effectively as an imaging lens in compact mobile cameras installed in portable telephones, portable personal computers, portable information terminals (PDAs), and the like.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims

What is claimed is:

1. An imaging lens comprising, in sequence from an object side to an image plane side:
    a first lens with a convex surface facing said object side and an overall positive refractive power;
    an aperture stop forming an opening with a predetermined diameter;
    a second lens with a convex surface facing said object side and an overall positive refractive power; and
    a third lens with a concave surface facing said object side and an overall negative refractive power;
    wherein:
        said first lens having at least one of said object side surface and an image plane side surface formed as an aspherical surface;
        said third lens having both an object side and an image plane side surface are formed as aspherical surfaces, and an inflection point at which curvature orientation changes is positioned within an effective diameter range of said image plane side surface
        condition (1) below is met:

$$0.5 < |R1/R2| < 2 \quad (1)$$

where R1 is a curvature radius of said object side of said first lens and R2 is a curvature radius of said image plane side of said first lens; and
condition (2) below is met:

$$D23/f < 0.1, D5/f < 0.2 \quad (2)$$

where f is a focal length of said lens system, D23 is a distance along an optical axis between said first lens and said second lens, D5 is a distance along said optical axis between said second lens and said third lens.

2. An imaging lens as described in claim 1 wherein said first lens and said third lens are formed from synthetic resin.

3. An imaging lens as described in claim 1 wherein:

$$TL/f < 1.4$$

where f is a focal length of said lens system and TL is a total length of said lens system from said object side surface of said first lens to an image plane on which an object is imaged.

4. An imaging lens as described in claim 1 wherein:

$$v1 > 45, v2 > 45, v3 > 45$$

where v1 is an Abbe number of said first lens, v2 is an Abbe number of said second lens, and v3 is an Abbe number of said third lens.

5. An imaging lens as described in claim 1 wherein:

$$0.8 < D1/D6 < 1.3$$

where D1 is a thickness along said optical axis of said first lens and D6 is a thickness along said optical axis of said third lens.

6. An imaging lens as described in claim 2 wherein:

$$TL/f < 1.4$$

where f is a focal length of said lens system and TL is a total length of said lens system from said object side surface of said first lens to an image plane on which an object is imaged.

7. An imaging lens as described in claim 2 wherein:

$$v1 > 45, v2 > 45, v3 > 45$$

where v1 is an Abbe number of said first lens, v2 is an Abbe number of said second lens, and v3 is an Abbe number of said third lens.

8. An imaging lens as described in claim 3 wherein:

$$v1 > 45, v2 > 45, v3 > 45$$

where v1 is an Abbe number of said first lens, v2 is an Abbe number of said second lens, and v3 is an Abbe number of said third lens.

9. An imaging lens as described in claim 2 wherein:

$$0.8 < D1/D6 < 1.3$$

where D1 is a thickness along said optical axis of said first lens and D6 is a thickness along said optical axis of said third lens.

* * * * *